Oct. 25, 1949.        D. W. STROM        2,486,075
MEANS FOR CLAMPING MACHINE PARTS TO BEDS
Filed April 5, 1946

INVENTOR
David W. Strom,
BY Parker, Trochnow & Farmer,
ATTORNEYS.

Patented Oct. 25, 1949

2,486,075

UNITED STATES PATENT OFFICE 2,486,075

MEANS FOR CLAMPING MACHINE PARTS TO BEDS

David W. Strom, Elmira, N. Y., assignor to Hardinge Brothers, Inc., Elmira, N. Y.

Application April 5, 1946, Serial No. 660,014

3 Claims. (Cl. 29—1)

This invention relates to improvements in means for removably securing machine parts to a machine bed having a longitudinally extending slot therein.

One of the objects of this invention is to provide clamping means of improved construction for use on machine beds of this type for more accurately and rigidly holding a machine part on a bed. A further object of this invention is to improve the construction of clamping members and bases of machine parts in such manner that improved clamping of the base on the bed results and in which the base can be made of greater strength without increasing the height of the same. A further object is to provide a base and clamping means of improved construction by means of which the base can be applied to the bed, removed therefrom, and again applied thereto with greater accuracy than was obtainable with bases and clamps as heretofore constructed. Another object is to provide a machine part with a base and clamping means which cooperate in such manner as to provide the minimum of distortion of the base when rigidly clamped to the bed. Another object of this invention is to provide a clamping device which is formed to engage opposite sides of the base of a machine part so that both sides of the machine part may be firmly drawn into engagement with the bed. Other objects and advantages of this invention will appear from the following description and claims.

Figure 1:
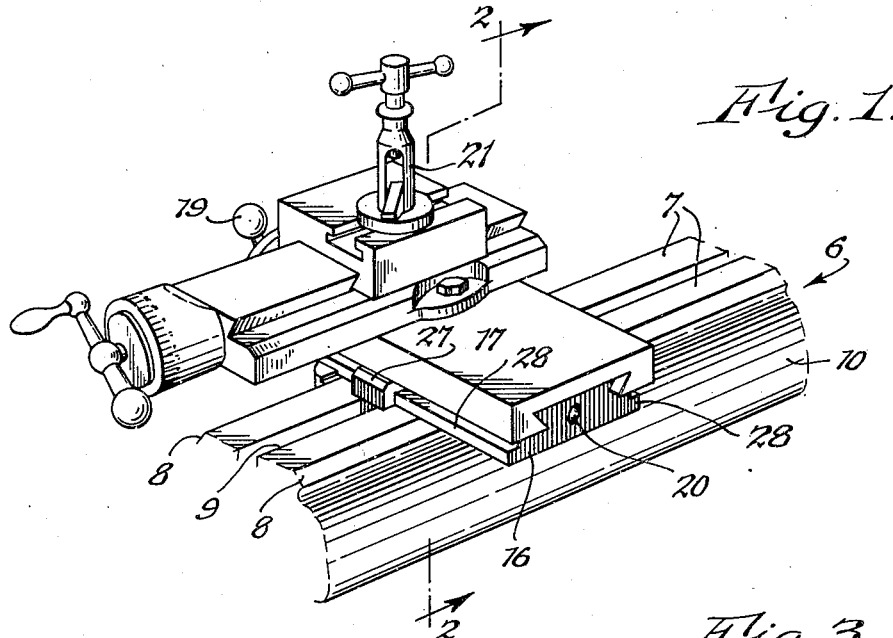
Fig. 1 is a perspective view of a part of a machine bed having a tool supporting slide rest clamped thereto by clamping means embodying this invention.

I have shown and described my invention in the accompanying drawings by way of example as applied to the mounting of a compound slide rest on the bed of a machine, such for example as a lathe, but it will be understood that it is not intended thereby to limit this invention to the mounting of slide rests on lathe bed, since it will be obvious that my improved clamping means may be applied to any other machine having a bed provided with a longitudinal slot extending through the same, and for securing parts other than slide rests to machine beds.

6 represents a portion of the bed of a lathe or other machine, that shown having a flat upper surface 7 terminating at opposite sides thereof in inclined faces 8. The bed also has the usual central longitudinal slot 9. The bed also includes downwardly extending flanges or aprons 10 formed integral therewith and terminating at their lower edges in inwardly and upwardly inclined flanges 11. The bed shown is of more or less conventional form as commonly used on lathes, and the bed also includes in the interior thereof a pair of downwardly extending flanges 12 at opposite sides of the slot 9 against the lower end of which the usual clamping nut 14 may engage. A bed of any other suitable or desired construction may, however, be employed in connection with my improved clamping means.

Figures 2, 3:
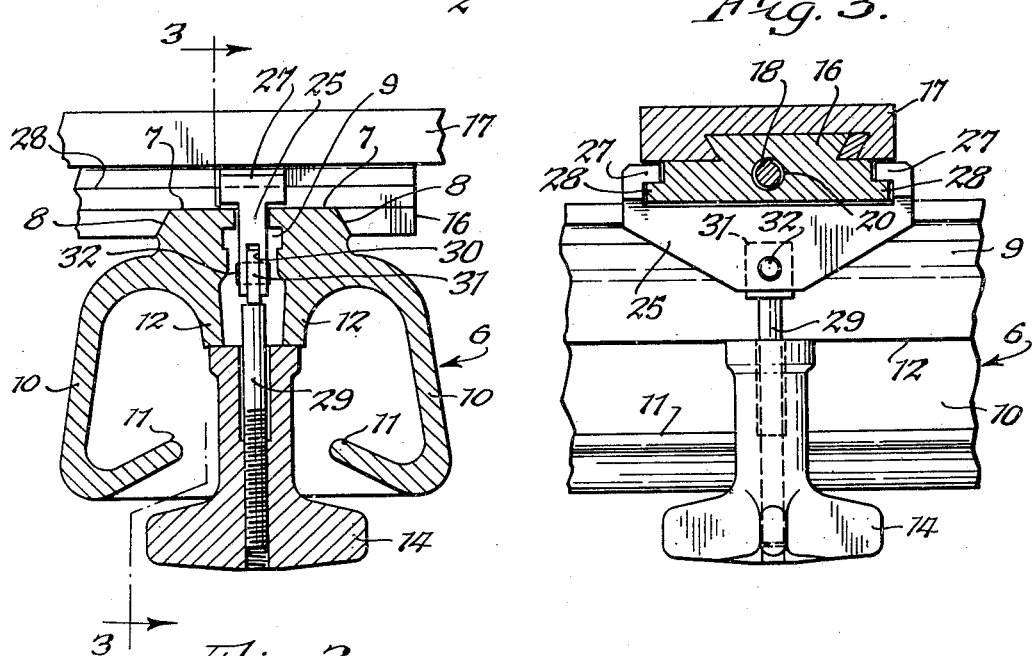
Fig. 2 is a fragmentary transverse sectional elevation of a machine bed having the base of a machine part secured thereto by clamping means embodying this invention.
Fig. 3 is a fragmentary sectional elevation thereof, on line 3—3, Fig. 2.

16 represents the base of a part to be secured to the machine bed. In the case of a compound slide rest, a bottom slide 17 is slidably mounted on suitable guideways on the base 16 to slide crosswise of the machine bed, the bottom slide being actuated by a suitable lead screw 18, Fig. 3, which may be turned by a hand wheel or crank 19, the screw cooperating with a threaded nut in the hole 20 in the base 16. Other parts of the slide rest may be suitably mounted on the bottom slide to support a tool post 21 which is formed to support a cutting tool. Since the construction of the slide rest shown does not of itself constitute a part of this invention, it will not be described herein in detail. Furthermore, my improved clamping means may be employed in connection with the supporting of any other machine part on a bed.

In clamping compound slide rests and other machine parts as heretofore constructed, to lathe beds, the base of the slide rest was generally provided with a T-slot which extended throughout the length of the base parallel to the threaded hole 20 of the base, and directly below the same, and a clamping bolt had its head arranged in the T-slot. This construction greatly reduced the strength of the base along the longitudinal central portion thereof, thus causing designers, in order to avoid increasing the height of the base, to use feed screws of smaller diameter than desired. Furthermore, when tension was applied to the bolt, several objectionable actions took place. In the first place, the tension of the bolt produced a deformation of the base, causing the sides thereof to pull away from the bed, thus decreasing the gripping action of the base on the bed. In the second place, when the nut of the clamping bolt was tightened, the friction of the nut on the bed and on the threads of the bolt tends to tilt the bolt and twist the same, which in turn caused the base of the slide rest to twist on the bed. This twist would vary at different times, so that the twisting of the base would vary when the slide rest was removed from the bed and again reset thereon. Consequently, even with lathes constructed with a high degree of accuracy, the best accuracy that could be depended upon in resetting a base on the bed was about 0.001 inch in one inch, which is not sufficiently accurate for modern machining requirements.

In order to overcome these objections to the prior constructions, I have provided an improved clamping device which does not require a T-slot in the middle of the slide rest base, and for this purpose I have provided a clamping member which grips the opposite sides of the base, for drawing the base downwardly upon the bed. In the construction shown by way of example, I provide a gripping member comprising a yoke member 25, the thickness of which is such that it can readily pass through the slot 9 of the bed, and which is provided at opposite ends thereof with claws or hooks 27 extending above the bed and formed to engage the upper faces of flanges 28 formed on the sides of the base. The claws or hooks may be considerably longer than the width of the slot 9 and may, consequently, engage the flanges 28 along substantial surfaces thereof.

The yoke member may be urged downwardly by any suitable means to draw the base 16 into contact with the bed 6, and in the construction shown, a bolt 29 is provided, one end of which is suitably secured to the middle portion of the yoke 25 and which is threaded and engaged by the clamping nut 14, which may be similar in construction to clamping nuts such as heretofore used for this purpose. The bolt may be rigidly secured to the yoke, or if desired, the bolt may have a pivotal connection with the yoke. This may, for example, be accomplished by providing an upright slot 30 in the lower portion of the yoke, into which a flattened part 31 of the bolt may extend, and a pin or rivet 32 may be employed to form a pivotal connection between the yoke and the bolt. Consequently, when the clamping nut 14 is turned in a direction to apply tension to the bolt 29, the yoke member will be urged downwardly, thus drawing the opposite sides of the base down upon the flat face 7 of the bed.

The construction described has the advantage that the usual T-slot extending lengthwise of the base is entirely eliminated, thus greatly increasing the strength and rigidity of the base, so that deflection and distortion thereof when subjected to strains, are reduced to a minimum. The eliminated of the T-slot also makes it possible to employ a large feed screw 18 without increasing the thickness of the base. By applying the pressure against the base at opposite sides of the base, there will be no tendency of the sides of the base to pull away from the bed and much greater effective clamping area is provided. Any twisting of the bolt 29, which may result from the tightening of the clamping nut, is not transmitted to the base 17, but is absorbed by the yoke bearing against the walls of the slot of the bed. Before any tension is applied to the bolt by the nut, the friction of the threads of the bolt and nut will cause the yoke to swing until the ends thereof engage the opposite walls of the slot of the bed, and when the nut is tightened, the greater torque on the bolt will be transmitted by the yoke directly to the bed. Consequently, the torque on the bolt will be absorbed entirely by the bed and will not be transmitted to the base 16, whereas in prior constructions in which the head of the bolt bears in a T-slot in the base, this torque is all transmitted to the base and results in a slight distortion thereof, which is in turn transmitted to the tool, resulting in corresponding inaccuracies in the work. These inaccuracies may only be in the order of tenths of thousandths of an inch, but they are sufficient to interfere with the production of work with the accuracy now commonly required.

Any tendency of the bolt to tilt when tension is applied to it by the clamping nut, will cause no unevenness of clamping pressure on the two sides of the base, since this tilting will be absorbed by the pivotal connection including the pivot member 32, or if the bolt 29 is rigidly secured to the yoke or formed integral therewith, there will be sufficient flexibility in the bolt and yoke to prevent unevenness in the clamping of the base on the bed by unequal pressures on the two sides of the base. Consequently, there will be no tendency of any kind for the base to rock or swing on the bed, thus overcoming the difficulties heretofore encountered with T-slotted bases.

As a result of these improvements in the construction of my improved clamping means, a slide rest or other machine part may be repeatedly applied to the bed and removed therefrom and each time the machine part is applied to the bed, it will be located thereon with an accuracy heretofore unobtainable. For example, an accuracy of at least 0.0005 in one inch is easily obtainable by means of my improved construction.

I claim as my invention:

1. In means for clamping the base of a machine part to a bed having a longitudinally extending slot therein, that improvement which includes a base having flanges at opposite sides thereof extending crosswise of said slot, a rigid yoke arranged in said slot and movable lengthwise of said slot to secure said machine part in different positions lengthwise of said bed and having claws extending out of said slot and into engagement with said flanges of said base, a bolt pivoted to said yoke intermediate of the ends thereof, and a nut engaging said bolt and said base for exerting a force on said yoke to urge said base into engagement with said bed.

2. Means for clamping a slide rest to a lathe bed having a flat face and a longitudinally extending slot therein, that improvement which includes a base for said slide rest having flanges at opposite sides thereof extending crosswise of said slot, said base and said flanges being formed to rest on the flat face of said bed, a rigid gripping member for said base and including a part extending into said slot of said bed and movable lengthwise of said slot to secure said slide rest in different positions lengthwise of said bed and having claws at opposite ends thereof which extend out of said slot into position to engage said flanges of said base, and clamping means engaging said gripping member midway between the claws thereof for exerting a force on said gripping member in a direction to urge said base into engagement with said flat face of said bed, said force on said gripping member being divided between said claws to exert substantially equal force on both of said claws.

3. Means for clamping a slide rest to a lathe bed having a longitudinally extending slot therein, that improvement which includes a base for said slide rest having flanges at opposite sides thereof extending crosswise of said slot, said base and said flanges being formed to rest on the upper flat face of said bed, clamping means including a rigid yoke arranged in said slot and having a claw at each end thereof extending upwardly out of said slot, each of said claws engaging a flange of said base, a bolt pivotally connected to said yoke and extending downwardly below said slot, and a clamping nut cooperating with said bolt and engaging the underface of said bed for drawing said bolt downwardly, said pivotal connection between said bolt and said yoke serving to equalize the force exerted on said yoke by said bolt and nut and distributing the force substantially equally between the two claws, for drawing the opposite sides of said base into engagement with the upper face of said bed.

DAVID W. STROM.

REFERENCES CITED

The following references are of record in the file of this patent:

UNITED STATES PATENTS

| Number | Name | Date |
|---|---|---|
| 148,113 | Fifield | Mar. 3, 1874 |
| 958,243 | Farwell | May 17, 1910 |
| 1,423,774 | Moore | July 25, 1922 |

FOREIGN PATENTS

| Number | Country | Date |
|---|---|---|
| 15,665 | Great Britain | 1911 |